United States Patent
Kawabe et al.

[19]

[11] Patent Number: 5,870,741
[45] Date of Patent: Feb. 9, 1999

[54] INFORMATION MANAGEMENT DEVICE

[75] Inventors: Shigehisa Kawabe; Yutaka Ogawa, both of Nakai-machi, Japan

[73] Assignee: Fuji Xerox Co., Ltd., Tokyo, Japan

[21] Appl. No.: 733,604

[22] Filed: Oct. 18, 1996

[30] Foreign Application Priority Data

Oct. 20, 1995 [JP] Japan .................................. 7-272457

[51] Int. Cl.$^6$ .................................................. G06F 17/30
[52] U.S. Cl. .................. 707/5; 707/4; 707/6; 707/10; 707/100; 707/104; 434/112; 455/457
[58] Field of Search ............................ 364/561; 434/112; 455/457; 707/4, 5, 6, 10, 104, 3, 100

[56] References Cited

U.S. PATENT DOCUMENTS

| | | | |
|---|---|---|---|
| 5,214,757 | 5/1993 | Mauney et al. ........................ | 395/161 |
| 5,402,347 | 3/1995 | McBurney et al. ..................... | 364/443 |
| 5,432,841 | 7/1995 | Rimer ...................................... | 379/59 |
| 5,470,233 | 11/1995 | Fruchterman et al. ................. | 434/112 |
| 5,528,518 | 6/1996 | Bradshaw ................................ | 364/561 |
| 5,561,704 | 10/1996 | Salimondo ............................... | 379/58 |
| 5,596,494 | 1/1997 | Kuo ......................................... | 364/420 |
| 5,682,525 | 10/1997 | Bouve et al. ........................... | 707/104 |
| 5,727,057 | 3/1998 | Emery et al. ........................... | 379/211 |

FOREIGN PATENT DOCUMENTS

| | | |
|---|---|---|
| 2-277169 | 11/1990 | Japan . |
| 5-281902 | 10/1993 | Japan . |
| 6-205457 | 7/1994 | Japan . |

OTHER PUBLICATIONS

Ikuno et al., "Personal Information & Intelligent Tool", Dec. 1993 Technical Report of IEICE, EID93-88, HC93-55 (1993-12), pp. 7-12.

Primary Examiner—Thomas G. Black
Assistant Examiner—Donald Min
Attorney, Agent, or Firm—Oliff & Berridge, PLC

[57] ABSTRACT

An information management device is provided which is capable of performing a flexible search of input information, without the need to attach user-specified keywords or search information and without the need of pre-processing of the input information such as character matching processing, natural language processing, statistical processing and recognition processing. The information management device is used in a network of multiple information processing devices at least one of which is a mobile information processing device and is equipped with an information input unit that inputs information via the mobile information processing device; an attribute value input unit that measures and inputs at least one of information attribute values from the mobile information processing device and attribute values of the information resulting from the input of the information; an information database that stores the information along with the corresponding attribute information; an information registration unit that registers the information and the attribute value to the information database; a search key input that inputs search keys; an attribute database unit that outputs at attribute information in response to the search keys; an information search unit that outputs to the information database; a search directive that includes at least one attribute information output from the attribute database; and an information output unit that outputs information from the information database in response to the search directive.

11 Claims, 12 Drawing Sheets

FIG. 5

| PLACE LOCATION COORDINATE RECORD 1 |
|---|
| PLACE LOCATION COORDINATE RECORD 2 |
| PLACE LOCATION COORDINATE RECORD 3 |
| PLACE LOCATION COORDINATE RECORD 4 |
| PLACE LOCATION COORDINATE RECORD 5 |
| PLACE LOCATION COORDINATE RECORD 6 |
| PLACE LOCATION COORDINATE RECORD 7 |

FIG. 10

| RECORD 1 | "FUJI XEROX MAIN BUILDING" | 1,2,100,101 |
| RECORD 2 | "ELECTRONIC CALCULATOR PRODUCT DIVISION" | 6660,6661,6662 |
| RECORD 3 | "PERSONNEL SECTION" | 1,2,3 |
| RECORD 4 | "MANAGEMENT DIVISION" | 100,101,102 |
| RECORD 5 | "RESEARCH LAB" | 1000,1001,1002 |
| RECORD 6 | "FUJI XEROX SATELLITE LAB" | 3,102,1002 |

INFORMATION MANAGEMENT DEVICE

BACKGROUND OF THE INVENTION

1. Field of the Invention

The invention relates to an information management device that manages information input from an information input device.

Specifically, the invention relates to an information management device which is ideal for managing information input from mobile information processing devices. More specifically, the invention relates to an information management device which is ideal for managing the information input from mobile information processing devices connected to network systems. In the present document, a mobile information processing device is defined as a mobile object that performs information processing.

2. Description of the Related Art

Conventional information management systems for mobile objects are categorized as follows:

(a) The systems usually have a database. The information input from a mobile object is registered to the database with a user-specified keyword each time a user inputs the information. The information is searched using the keywords or the search information that includes the keywords.

(b) The information input from a mobile object is registered to the database with a character or a character string. In some system, a character or a character string are generated through text processing, natural language processing, statistical processing or recognition processing of the input information, and attached to the information to be registered to the database. The information is searched using search information which includes the character or character string.

(c) The position information of a mobile object is registered to the database. The position of a mobile object is searched using its identifier. Conversely, the identifier of a mobile object is searched based on the region of its position.

Since the system (a) manages the information using the user-specified keywords or search information, it cannot search the information with a character string unless it has been previously stored with a keyword or search information. Also, the search is possible only by the keywords the user previously specified. In other words, the search is not possible using character strings or search information not previously specified by the user. Hence it is extremely difficult to optimize the search keys for future searches, and a good selection of the character strings and the search information is often costly.

The system (b) generates a character, a character string or data string through character matching processing, natural language processing, statistical processing or calendar processing. It is then registered to the database either with the input information, without the input information, or as the search information of the input information. Pre-processing such as character matching requires large processing cost, which is likely to overload mobile objects with a limited processing power due to the need for low energy consumption and small sizes. This inevitably causes a delay in registering the input information. Although a solution is to use the processing resources of other computers on the network via communication, the communication procedure also takes time.

The system (c) simply searches the position or the identifier of mobile objects, and does not have the function of attaching the position information of a mobile object to the input information from the mobile object. It is not possible, therefore, to search the input information from a mobile object using the position information of the mobile object.

Bibliographic material related to the systems (a), (b) and (c) described above are found in the Japanese Unexamined Patent Publication No. 6-205457, Japanese Unexamined Patent Publication No. 5-281902 and the Technical Report of IEICE EID93-88, HC93-55, December 1993, pp. 7–12. Japanese unexamined Patent Publication No. 6-205457 discloses a means to reduce the cost of registering position information to the network of mobile objects when many mobile objects move simultaneously, by receiving the signal from the mobile terminals at a base station and storing the position information of the mobile terminals in a database. Japanese unexamined Patent Publication No. 5-281902 publicly discloses a means to accurately capture the current positions of mobile objects by transmitting the current position information and calculating the position information using a road map database. The above Technical Report of IEICE publicly discloses a means to save raster image information of hand written letters after recognizing and converting it to text information that consists of a character code.

SUMMARY OF THE INVENTION

In view of the problems discussed above, an objective of the invention is to provide an information management device which is capable of performing a flexible search of input information, without the need to attach user-specified keywords or search information and without the need of pre-processing of the input information such as character matching processing, natural language processing, statistical processing and recognition processing.

To achieve the above objective, the invention is used in a network of multiple information processing devices at least one of which is a mobile information processing device. In the invention, a first embodiment of the information management device that manages the information input from the mobile information processing device is equipped with an information input unit that inputs information via the mobile information processing device; an attribute value input unit that measures and inputs at least one of information attribute values from the mobile information processing device and attribute values of the information resulting from the input of the information; an information database that stores the information along with the corresponding attribute information; an information registration unit that registers the information and the corresponding attribute values to the information database; a search key input unit that inputs search keys; an attribute database unit that outputs at least one attribute information in response to the search keys; an information search unit that outputs to the information database search information that includes at least one attribute information output from the attribute database; and an information output unit that outputs information from the information database in response to the search information.

In the first embodiment, attribute values are detected at the time of information input, and the attribute values are registered to the information database along with the information itself. In the search mode, information is obtained by generating attribute values from the input search information, and by searching the information database by using the attribute values. Neither the input of the search keys nor special pre-processing is necessary. Flexible search is realized by modifying the attribute database unit that generates the attribute values from the search information.

According to a second embodiment of the invention, the invention is used in a network of multiple information processing devices at least one of which is a mobile information processing device and is equipped with an information input unit that inputs information via the mobile information processing device; an attribute value input unit that measures and inputs at least one of information attribute values from the mobile information processing device and attribute values of the information resulting from the input of the information; a search key generation unit that generates at least one search key in response to the input attribute information; an information database that stores the information along with the corresponding at least one generated search keys; an information registration unit that registers the information and the at least one search key in the information database; a search key input unit that inputs the at least one search key; an information search unit that outputs to the information database search information that includes the at least one search key which is input via the search key input unit; and an information output unit that outputs information from the information database in response to the search information.

In the second embodiment, search keys are generated automatically from the attribute values at the time of information input based on the characteristics of the attributes, and the search keys are registered in the information database along with the information itself. In the searching mode, the information database searches using the search keys. Accordingly, the information is registered with little burden on the user, and the search is easily done by using the search keys. Flexible search is realized by modifying the configuration of the search key generation unit that generates the search keys based on the attribute values.

Further, according to the invention, at least one of the information, the attribute information, the search keys and the search information is transmitted via a communication unit.

According to a third embodiment of the invention, a general information management device is equipped with an information input unit that inputs information via the mobile information processing device; an attribute value input units that measures and inputs at least one of information attribute values that arise from the mobile information processing device and information attribute values resulting from the input of the information; an information database that stores the information along with the corresponding attribute information; an information registration unit that registers the information and the attribute value in the information database; a search key input unit that inputs search keys; an attribute database unit that outputs at least one attribute information in response to the search keys; an information search unit that outputs to the information database search information that includes at least one attribute information output from the attribute database; and an information output unit that outputs information from the information database in response to the search information.

In the third embodiment, the information input from a mobile information processing device is searched easily by using the attributes related to the mobile object, if the information is input from the information input unit of the mobile information processing device or the information input device connected to the mobile information processing device.

According to a fourth embodiment of the invention, a general information management device is equipped with an information input unit that inputs information; an attribute value input unit that measures and inputs at least one of information attribute values that arise from the mobile information processing device and information attribute values resulting from the input of the information; a search key generation unit that generates at least one search key in response to the input attribute information; an information database that stores the information along with the corresponding at least one search key; an information registration unit that registers the information and the corresponding at least one search key in the information database; a search key input unit that inputs the at least one search key; an information search unit that outputs to the information database search information that includes the input at least one search key; and an information output unit that outputs information from the information database in response to the search information.

In the fourth embodiment also, the information input from a mobile information processing device is searched easily by using the attributes related to the mobile object, if the information is input from the information input unit of the mobile information processing device or the information input device connected to the mobile information processing device.

BRIEF DESCRIPTION OF THE DRAWINGS

These and other objects and advantages of the invention will become apparent from the following detailed description of preferred embodiments when taken in conjunction with the accompanying drawings, in which:

FIG. 5 is a place location coordinate management table utilized in the configuration of FIG. 2;

FIG. 10 is an organization name vs. host management table utilized in the configuration of FIG. 7;

DETAILED DESCRIPTION OF THE PREFERRED EMBODIMENTS

Figure 1:
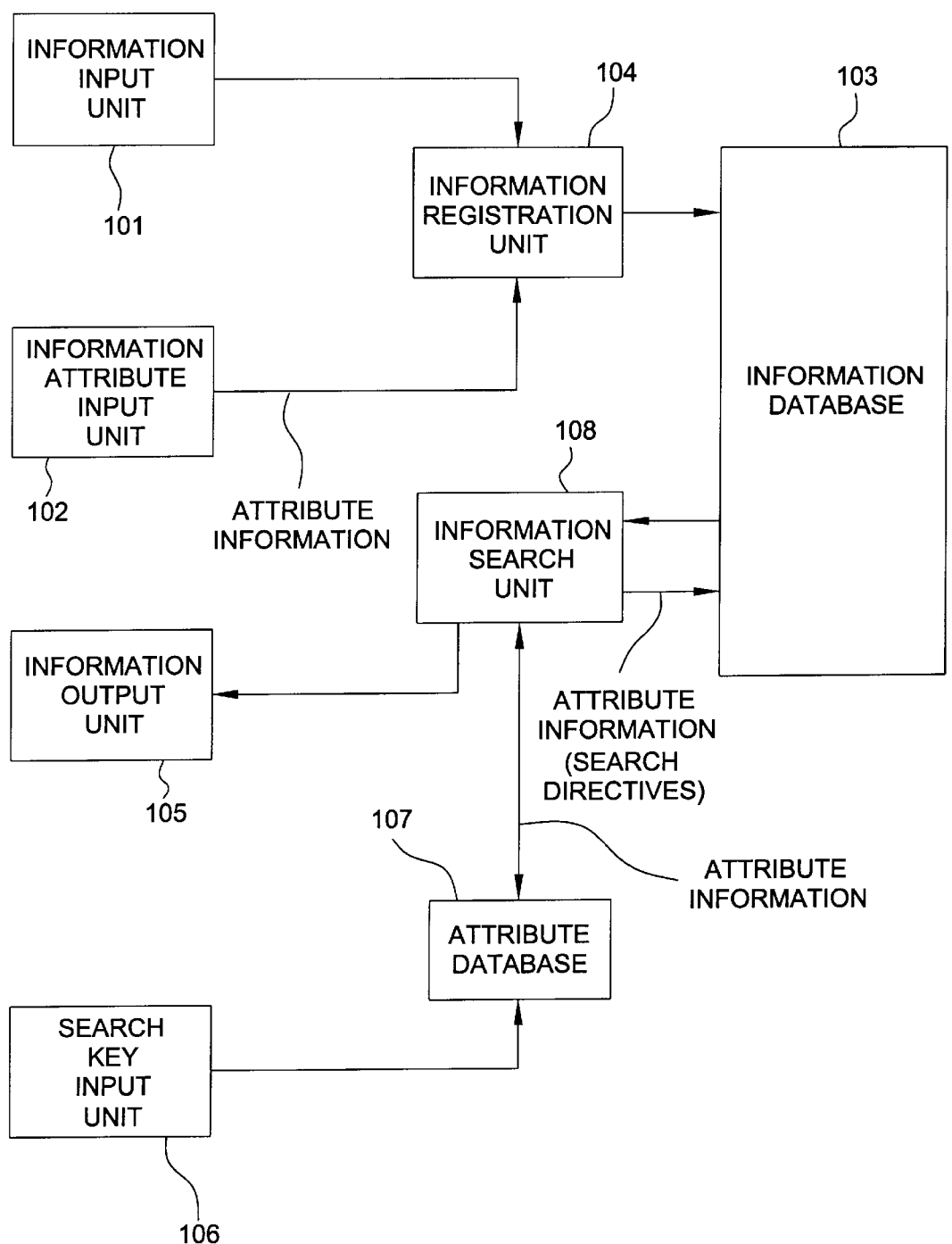
FIG. 1 is a block diagram of a preferred embodiment of the information management device of the invention.

For a general understanding of the features of the invention, reference is made to the drawings. In the drawings, like reference numerals have been used throughout to designate identical elements.

FIG. 1 is a block diagram of the first embodiment of the invention. In FIG. 1, the information management device includes information input unit 101, the attribute input unit 102, information database 103, information registration unit 104, information output unit 105, search key input unit 106, attribute database 107 and information search unit 108. The information input unit 101 inputs various information such as text and images. The attribute input unit 102 detects the information attributes that arise at the time of input of the information by information input unit 101 and the information attributes resulting from input of the information. The information registration unit 104 registers the information and the detected attributed values in the information database 103. The search key input unit 106 accepts search information such as search keys. The attribute database 107 outputs the corresponding attribute values based on the search information. The information search unit 108 sends search information, or directives including the attribute values to the information database and transfers the search results to the information output unit 105 which outputs the search results.

As clearly illustrated in the embodiment shown in FIG. 1 and the other embodiments described below, the invention can be embodied as a single process or multiple processes in an information processing device or a mobile information processing device. The invention can also be embodied as multiple processes in multiple information processing devices in the network system of multiple inter-connected information processing devices. At least one of the information processing devices can be a mobile information processing device.

In the case where mobile information processing devices are continuously or discontinuously connected to the network system of multiple information processing devices, the information input from the mobile information processing device is stored in the database in the remote information processing device, and thereafter the information can be accessed by the user with an appropriate search. This example is explained hereafter, with reference to FIG. 12 and FIG. 14.

The information database is not necessarily a single database. It may also be a set of multiple databases, and it can reside in any information processing devices other than the mobile information processing devices. The only requirements of the information database are to be able to determine in advance the procedure for information registration and search, and to be accessible by the mobile information processing devices or other information processing devices.

Also, the registration of the input information to the information database does not have to be done immediately upon information input. The registration only needs to be done at a certain time between the information input and the search execution.

Attribute detection does not have to be done immediately upon information input. The measurement or the detection only needs to be done at an arbitrary time before or after the information input.

Figure 2:
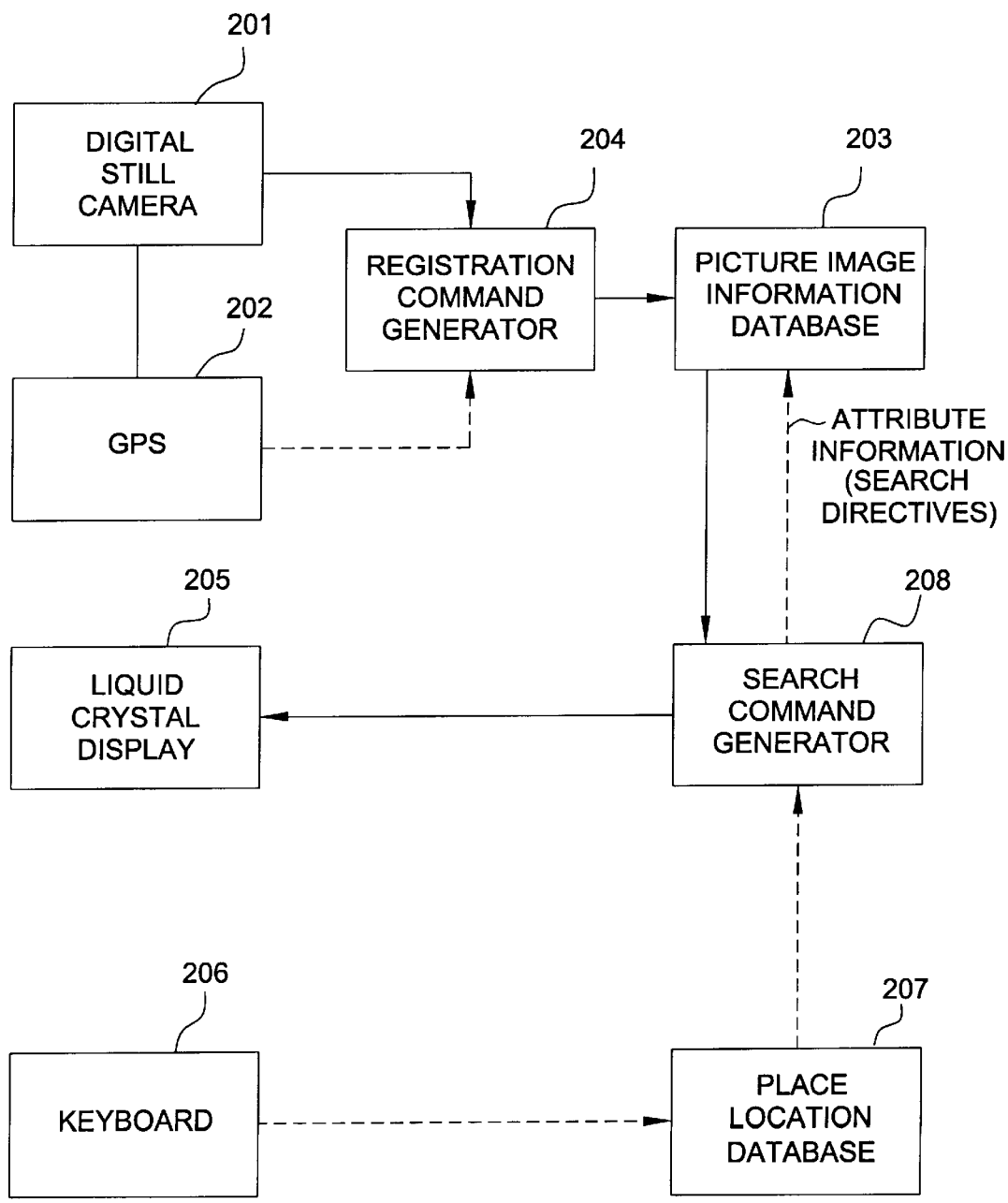
FIG. 2 is a block diagram of a first configuration of the embodiment of FIG. 1.

FIG. 2 is a block diagram depicting a first configuration of the first embodiment. In FIG. 2, the information input unit 101 corresponds to the digital still camera 201. The digital still camera 201 is a device that converts photographed images and outputs the converted image to the registration command generator 204 (corresponding to the information registration unit 104), and charge coupled devices, such as the DS-200FDIJE by Fuji Photo Film, Inc. (trademark or product name), can be used for this purpose.

Although FIG. 2 shows the digital still camera 201 used as the information input device 101, a tablet digitizer such as the tablet digitizer HDG-06091 by Hitachi Precision Engineering, Inc (trademark or product name) can also be used for the same purpose.

The information input device can also be a keyboard connected to conventional personal computers that input text information, or a voice input device with a microphone and an AD converter that inputs vocal information. It may also be an image input device with a conventional video camera and an AD converter that inputs image information. The image input device, for example, can be configured by a video camera that outputs an NTSC signal and Smart Video Recorder System by Intel, Inc. (trademark or product name).

The attribute input unit 102, which inputs the information attributes that arises from the mobile object, is a global positioning system (GPS in the following) 202. GPS 202 communicates with multiple communication satellites to measure one or more of longitude, latitude, time, altitude and velocity which are at least pre-defined as the information attributes "the mobile object was at a certain position when received the information input," and transmit them to the registration command generator 204 (corresponding to the information registration unit 104) as the attribute values of predefined attributes. As GPS 202, for example, a mobile GPS device GP 803 by Socket Communications, Inc. (trademark or product name) can be used.

Although FIG. 2 shows GPS 202 as the attribute input unit 102, it can be an address acquisition device that acquires address information from the base stations of the network. In this case, the information is "the object that received information input connected to a particular base station," and its attribute is the address information from the base station.

The attribute input unit 102 can be a clock device which counts time and outputs to the registration command generator 204 (the information registration unit 104), or a calendar device that counts and outputs the date. The information in this case is "the information input took place at a certain time," and its attribute is the time or date. Both of the clock devices and calendar devices may be purchased as IC chips.

It may also be a light measuring device that measures the brightness or color and outputs to the registration command generator 204 (the information registration unit 104). A photometer or a color tone meter for photography may be used as a light measuring device. It may also be a sound measuring device that measures the surrounding sound volume and outputs to the registration command generator 204 (the information registration unit 104), or a spectrum analyzer that incorporates the surrounding sound, measures its frequency distribution and outputs the results to the registration command generator 204 (the information registration unit 104). In these cases, the information is "the information input occurred at a certain position," and its attribute is "brightness of the position," "color," and "sound volume," respectively.

In FIG. 2, an digital still camera 201 is used to photograph objects. The attributes can also be "distance to objects," or "size of objects." The control mechanisms for automated focusing of auto-focusing cameras can be used as a device to measure distance to objects. Given that the viewing angle of the digital still camera is known, the approximate size of the part of an object captured in the photographing frame of the digital still camera can be calculated. The actual horizontal and vertical length of the object appears in the frame is approximately given, respectively, by $2*d*\tan(Ex/2)$ and $2*d*\tan(\theta y/2)$, where d is a distance to the object, $\theta x$ is a horizontal viewing angle, and $\theta y$ is a vertical viewing angle.

Further, if the information database 103 of the configuration shown in FIG. 2 is the image information database 203, it stores image information and manages the coordinate date attached to the image information so it can be used as search keys for information search.

As the information database 203, G-BASE by Rico, Inc (trademark or product name), an extended relational database management system, can be used. G-BASE stores image information as variable length binary data and manages the image information such that it can be searched by using the coordinate data as search keys, by designing schema that attaches the coordinate data as attributes. In G-BASE, the registration and search of the image information can be done using an operational language GSQL, an extension of the standard SQL. The details of the operational language GSQL are found in volume 5 of the G-BASE manual by Rico, Inc.

The information registration unit 104 comprises the registration command generator 204, which generates the registration formula according to GSQL, and outputs to the image information database (corresponding to the information database 103).

In other words, the registration command generator 204 generates an information registration command based on GSQL, which takes as arguments the date from the image information from the digital still camera 201, and the attribute values from GPS 202. The registration command generator 204 then outputs the command to G-BASE, i.e., the image information database 203.

The search key input unit 106 inputs the character as well as the character row and comprises a keyboard apparatus 206 that outputs to a place location database 207 (attribute database 107). Utilization may also be made of a user interface of the menu type in lieu of the keyboard apparatus 206. The user interface displays one or more of the selected branch lists on the display as a menu and by the selection of one or a multiple of selected branches by the tablet digitizer, the mouse, or keyboard, a corresponding number, character or string can be created. The user interface of the menu type utilizes a windows system software tool kit which can be easily expressed (O'Reilly and Associates, Inc. X View Programming Manual Vol. 7 2'ND edition fourth printing pp. 237–267 and pp. 588–592).

In addition, the search input unit 106 may also comprise an OCR apparatus that recognizes handwriting or printed text. Characters are written on the tablet by means of a similar pen, and utilization may also be made of a handwriting character recognition apparatus such as the PI-3000 (also a trademark or brand name) of the Sharp company, which recognizes characters.

Figure 4:
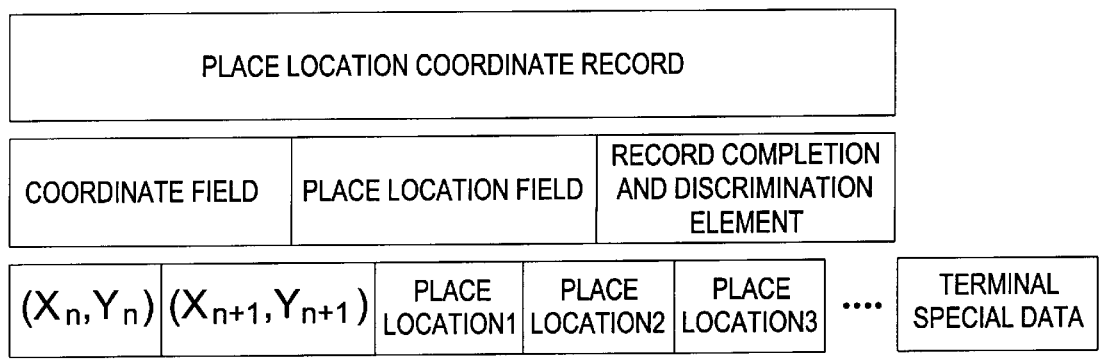
FIG. 4 is a place location coordinate record utilized in the configuration of FIG. 2.

The attribute data base 107 inputs place locations and includes place location database 207 that outputs single or multiple coordinates displayed by a pair including longitude and latitude. The place location database 207 utilizes the place location coordinate management table which is obtained from the multiple place location coordinate records, as shown in FIGS. 5 and 4, respectively. The place location coordinate record has a coordinate field, a place location field, and a record and discrimination element. The place location field records the string that expresses one or a multiple of place locations, and in the coordinate field, is recorded a corresponding one or multiple number of coordinates. When the place location is input, the characters are matched with the place location field of each record for the string, and when there is correspondence, the coordinates of the coordinate field of its record is output. When there is no correspondence, an error is output.

The information search unit 108 creates the information search formula used in the GSQL character unit and comprises a search command generator 208 that outputs to the image information database 203 (information data base 103). The search command generator 208 generates a specific information search command on the basis of the GSQL that comprises the argument of the single or multiple coordinate values output from the place location database 207 on the basis of a directive to the user, and is output to the image information database 203 (G-base). Furthermore, the registration command generator 204 (information registration unit 104) and the search command generator 208 (information search unit 108) may be separately configured, or may be configured as a single apparatus, and may also be configured such that the GSQL command generator is output in lieu of the search command and registration command corresponding to the input data.

The information output unit 105 comprises an ordinary liquid crystal display 205 that displays the image information output from the image information database 203. Naturally, utilization may be made of a plasma display or a CRT display. In addition, utilization may be made of a printer.

Next, a detailed explanation is provided with respect to the registration of the data and the search (the operation of the registration command generator 204 and the search command generator 208) in the configuration of FIG. 2.

First of all, an explanation will provided with respect to the registration of the information. In the configuration of FIG. 2, the name image information data base 203 referred to as the image DB is created by the following GSQL formulae.

GSQL formula 1-1:
CREATE SCEMA INTO '/test/dbl';
GSQL formula 1-2:
CREATE TABLE imageDB (
longitudeflag CHARACTER (1),
Longitude INTEGER (8),
latitudeflag CHARACTER (1),
Latitude INTEGER (9),
IMAGE VARIABLE CHARACTER
);

The GSQL formula 1-1 manifests the creation of the name database known as dbl in the directory known as /test. The GSQL formula 1-2 records the internal composition of the dbl. In other words, the attribute, which serves as the first argument with the name of longitudeflag, is a character having a length of 1; the attribute, which serves as the second argument with the name Longitude, is an integer having a length of 8; the attribute, which serves as the third argument with the name of latitudeflag, is a character having a length of 1; the attribute, which serves as the fourth argument with the name of IDO, is an integer of the length of 9; and the attribute, which serves as the fifth argument with the name of IMAGE, is a variable length character, thereby manifesting the creation of the database of the name imageDB.

When the digital still camera 201 starts image capturing, the database of the captured image information is input and sent to the registration command generator 204. Corresponding to the commencement signal of the digital still camara 201, at the same time as starting, one or a multiple number of high degree matter attributes such as the date, time, latitude and longitude from the GPS 202 are measured. With this configuration, utilization is made of latitude and longitude as the attribute information, and the pair comprising latitude and longitude is sent to the registration command generator 204. Naturally, utilization may be made of other attributes.

For example, at the time of the starting of the digital still camera 201, with "Japan Railraod Shibuya station", if the time table of the Japan Railroad Yamate line is captured, then the "image of the time table" is sent to the registration command generator 204. At the same time, the coordinate values (X1, X2) comprising a pair of latitude and longitude which comprise the attributes of the information that manifests the "Japan Railroad Shibuya station which has been captured" is sent to the registration command generator 204 which is automatically measured by the GPS 202.

The registration command generator 204 receives and takes the image information data and the coordinate values, and produces a registration command on the basis of the GSQL as a search key of the data of the image information. The generated command is as follows.
GSQL formula 1-3:
INSERT INTO imageDB VALUES ('E', X1, 'N ', Y1, 'image data');

With GSQL formula 1-3, the first argument is separated by the east longitude and the west longitude, and the east longitude is formed of the character E'; the second argument is a longitude value of X1; the third argument is separated by the north latitude and the south latitude, and the north character is formed of the character 'N'; the fourth argument is a latitude value of Y1; and the fifth argument comprises the 'image data' and the text string which is encoded in the text string that encodes the image input from the digital still camera 201. Also, the formula applies the coordinate value to the image data and manifests the registration command which is registered in the data base known as image DB.

In encoding the image in the text data, utilization may be made for example of the MIME encode command which is standard in the UNIX (brand name) unencode command or in the RFC 1521–RFC 1524. Naturally, the image may be registered in its existent state without encoding.

The information search will be explained next. The search is accomplished utilizing a region or place location that includes the input location of the place or place location data.

If the input of the place location is accomplished by the keyboard 206, then the corresponding string is sent to the place location database 207. And the place location database 207 output 1 or a multiple of pairs of two coordinates manifesting one or multiple coordinates or the corresponding rectangular shaped region on a map.

Figure 3:
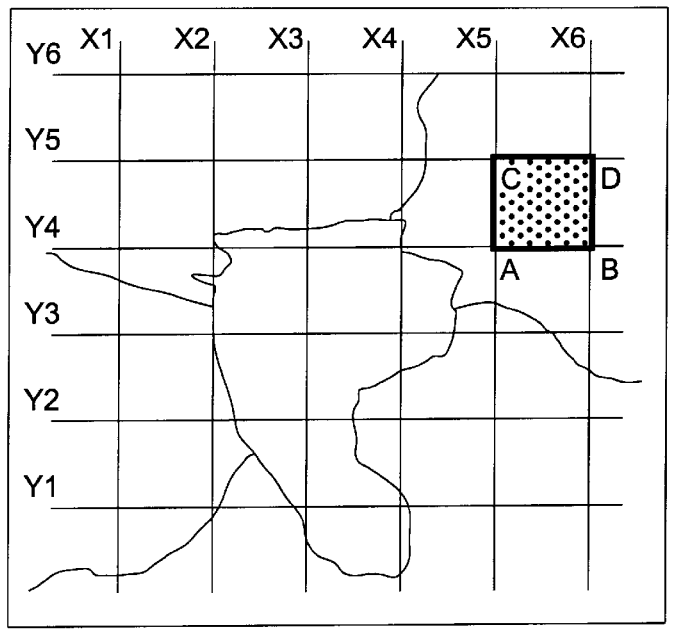
FIG. 3 is a graph utilized in the configuration of FIG. 2.

As shown in FIG. 3, vertically dividing lines and horizontally dividing lines are attached with spaces relative to a map, forming the standard rectangular areas. As concerns the rectangular areas standardized by the A, B, C, and D, of the map, the coordinates for each of the point items A, B, C, and D are manifest as (XN, YN), (XN+1, YN), (XN, YN+1), (XN+1, YN+1). Since the rectangular regions can be standardized by two point coordinates that form diagonal lines, the rectangular regions can be manifest utilizing the pair {(XN, YN), (XN+1, YN+1)} of the coordinates of A+D. Furthermore, in one rectangular region, one or more place locations will be present.

FIG. 4 shows the format of the place location coordinate record of the place location corresponding to place location coordinate management table (FIG. 5). One record is formed from a place location field that stores one or a multiple of place locations, and the coordinate field that manifests two of the coordinate fields that forms one rectangular region. Since one place location field has a variable length in which a number of resident place locations are stored, it can be managed as a list of place locations, and the final terminal signal can be stored as a special discrimination element for the end of the list of place locations. Naturally, utilization may be made of other management means for variable length records, including those of a fixed length. For example, the place location relative coordinate management table may be constructed by the coordinate field of a fixed number and the place location field of a specified number, and one region may manifest multiple records.

FIG. 5 is a place location coordinate management table with multiple place location coordinate records. With a place location database in which utilization is made of the place location coordinate management table, the coordinate values are output as follows. First, if "Japan Railroad Shibuya station" is input as the place location from the keyboard 206, then the string is sent to the place location database 207 as a search key. The place location database 207 compares the place location within each of the place location coordinate records with the place location "Japan Railroad Shibuya station" and if the two match, the coordinate field of the record is added to the output coordinate list.

Figure 6:
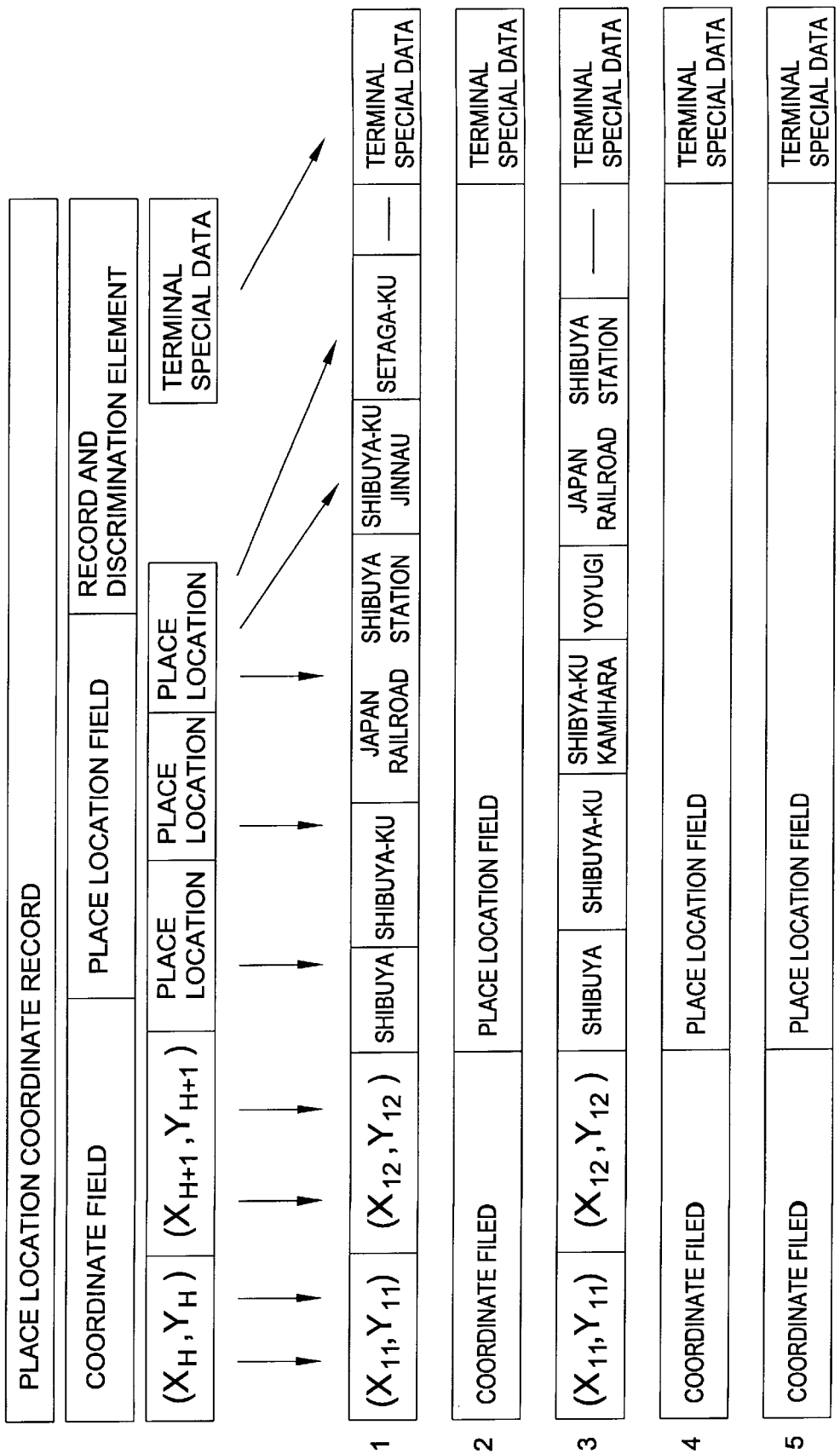
FIG. 6 is a place location coordinate record utilized in the configuration of FIG. 2.

With the specific place location management table shown in FIG. 6, since the "Japan Railroad Shibuya station" is included in the third place location field of record 1 and in the fifth place location field of the 3rd record, the output coordinate list becomes $\{(X11, Y11), (X12, Y12)\}$, $\{(X31, Y31), (X32, Y32)\}$. Thus, the two rectangular areas $\{(X11, Y11), (X12, Y12)\}$, $\{(X31, Y31), (X32, Y32)\}$ are added to the output coordinate list.

The place location database 207 sends the output coordinate list indicated above to the search command generator 208. Further, with the place location database 207, a chronological examination is made of the records within the place location coordinate management table; however, searching may also be accomplished utilizing a hash table. In other words, in the place location coordinate record, pre-determined numbers are applied and, relative to the place location string, a specific hash function is designed, forming the place location coordinate management table as a hash table. In addition, the place location database may also be configured utilizing a relational database system.

The search command generator 208 creates the GSQL for searching the image information database 203 from among the multiple coordinate pairs obtained from the place location database 207. By means of this example, the GSQL formulae are created as follows:
GSQL Formula 1-4:
DECLARE LOCAL TEMPORARY TABLE temp I(
longitudeflag CHARACTER (1),
Longitude INTEGER (8),
latitudeflag CHARACTER (1),
Latitude INTEGER (9),
IMAGE VARIABLE CHARACTER
);
GSQL FORMULA 1-5:
INSERT INTO temp. tempI
SELECT longitudeflag, Longitude, latitudeflag, Latitude, IMAGE
FROM imageDB
WHERE longitudeflag='E'
AND Longitude>X11
AND Longitude<X12
AND latitudeflag='N'
AND Latitude>=Y11
AND Latitude≦Y12;
GSQL FORMULA 1-6:
INSERT INTO temp. temp 1

```
SELECT longitudeflag, Longitude, latitudeflag, Latitude,
IMAGE
FROM imageDB
WHERE longitudeflag='E'
AND Longitude≧X31
AND Longitude≦X32
AND latitudeflag='N'
AND Latitude≧Y31
AND Latitude≦Y32;
GSQL FORMULAS 1-7:
COMMIT;
GSQL FORMULAS 1-8:
SELECT DISTINCT IMAGE
FROM temp. temp 1;
```

The above GSQL formulae are sent to the image information database 203, and the corresponding image is searched. If the picture image in the search conditions are stored, then the coordinates and the picture image data are output as the coordinate picture image corresponding table shown by line 1. If it is not a picture image that complies with the search conditions, nothing is sent, and if there is one, then one line is sent, and if there are multiple numbers, then only the corresponding line numbers are output. With the coordinate picture image corresponding table, one picture image data and the coordinates that show the attribute values of the latitude and longitude comprising the attributes of the "a picture image is input at some locations" matter correspond.

The liquid crystal display apparatus 205 obtains the string of the image field of one line of the coordinate picture image corresponding table of the search results, because it comprises the image data. When the picture image data is recorded in the picture image database 203, since the picture image data is recorded in the image data encoded in the text information, in order to restore it, the image data must be decoded. With the first configuration, since utilization is made of unencode which is well known with UNIX OS encoding, utilization is made of the undecode program. When utilization is made of the MIME encode program, utilization is made of the MIME decode program. Generally, the decode program is determined by the one that resides in the encode program. Naturally, if the picture image data is registered without encoding, there is no necessity of accomplishing decoding. In addition, even when encoding and registering, display may be accomplished in the liquid crystal display apparatus 205 without decoding.

The decoded picture image data is displayed in the liquid crystal display apparatus 205. When the coordinate picture image corresponding table is created from multiple lines, it is executed through the repeating of the above chronology.

With the first configuration, the value of the coordinates that comprise the attributes of the matter of the captured time table at the "Japan Railroad Shibuya station" comprise (X1, Y1), owing to which the first record of the place location corresponding coordinate management table and the values {(X11, Y11), (X12, Y12)}, {(X31, Y31), (X32, Y32)} of the coordinate fields of the third record respectively are X11≦X1<X12, Y11≦Y1<Y12, X31≦X1<X32 and Y31≦Y1<Y32.

This is because the "Japan Railroad Shibuya station" is formed from either the region {(X11, Y11), (X12, Y12)}, or the region {(X31, Y31), (X32, Y32)}. As indicated above, the picture image of the time table of the Japan Railroad captured at the "Japan Railroad- Shibuya station" must necessarily be included in the coordinate picture image corresponding table output by means of the displayed GSQL command.

As explained above, the picture image of the time table of Japan Railroad captured by the digital still camera at the Japan Railroad station can subsequently be searched by the place location formed from the "Japan Railroad Shibuya station". As concerns the region {(Xm, Ym), (Xm+1, Ym+1)} that includes the place location formed from "Shibuya" for the place location corresponding coordinate management table, if construction is such that Xm≦X1<Xm+1, and Ym≦Y1<Ym+1, then the picture image of the time table of the Japan Railroad captured with the digital still camera at the Japan Railroad Shibuya station can be searched by the place location formed from "Shibuya".

With the first configuration of the first embodiment, the search key was a place location; however, utilization may be made of an address, a country name, a city, Hokkaido, or a prefectural name, a city, town or village name, a building name, a facility name, an organization name, a government bureau name, the name of a company, a legal name, a management enterprise address name, the number of a store, the name of a sales outlet, a river name, land or a hill or name of a mountain or mountain range, a road name, a pass name, a line name, an intersection name, the name of a stop, a station name, the number of stages, or a postal number, and the like.

Ordinarily, utilization is made of the corresponding relationship of a region with a corresponding name, and the name of a place that includes the various place locations, where a place location coordinate management table that provides support management prepared in advance in the manner described above, is realized with an information management apparatus that searches the picture image of at least the name of a selected location recorded in the place location corresponding coordinate management table. Particularly in terms of moving bodies, when taking a photograph, two matters occur simultaneously, one being "a picture image is captured", and at the time that the picture image is captured, "in a certain location". In this configuration, utilization is made of coordinates as the attributes of the matter relating to "a picture image was captured in some location". In other words, application is made of the coordinates obtained by automatically measuring the coordinates of a captured point relating to the captured picture image data, and the captured picture image information is recorded in the information database 103. There is no need for the user to apply a particular key word or search information when storing the picture image information, and the recognition processing of the picture image or processing prior to the total processing and the like is unnecessary. Also, the characters determined by the captured location and the string can be used to search the captured data.

Further, mobile information input and registered in the database shall not be restricted to image information, and can include characters, character strings, audio information, and video information. Audio and video information can be encoded into text data, and then decoded and restored as previously mentioned.

Also, material attributes are not restricted to longitude and latitude, and can use many measurable attributes such as the location where the information was recorded, brightness, color, temperature, humidity, weather, barometric pressure, and sound levels. If the output is an integer or real number representing the designated precision of the measurement results of the attribute value, then it can be configured in the same manner as this configuration.

In this example embodiment, information is searched by using search information including the attribute value, which is first measured as the attribute value of an attribute of a material which occurs when information is input, and then recorded with information, followed by the transformation of the search key into the attribute value. Based on this, there is no trouble in providing a search key which is currently present when inputting information, and there is also no need for pre-processing to generate a search key. In addition, a search means using material attributes, such as an "Image shot at Shibuya station", enables a search function much as a human being recollects his or her memory, thus providing an extremely flexible search means, and increases the adaptability of information management of network systems which include mobiles objects.

The following is an explanation of a second configuration of the first embodiment. This configuration uses a file input device as the information input unit 101, uses "the fact that the file was input with the use of a designated host computer" as information, and uses that host computer's host number as the attribute of the information.

Figure 7:
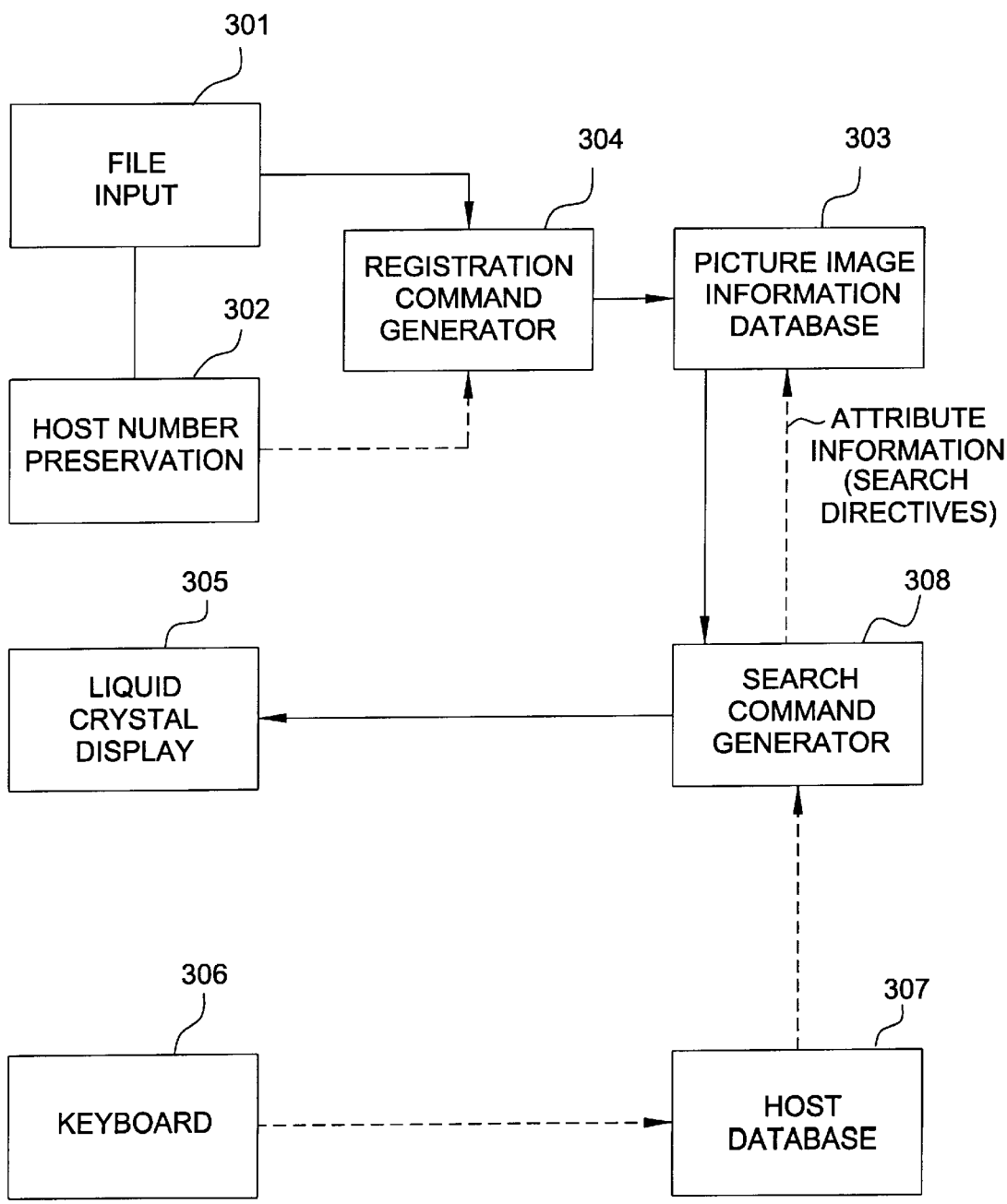
FIG. 7 is a block diagram of a second configuration of the embodiment of FIG. 1.

The second configuration of the first embodiment is shown in FIG. 7 and components and parts that are the same as components and parts in FIG. 2 are given corresponding reference numbers and a detailed explanation with respect to the components and parts is omitted. In FIG. 7, file input device 301, which is realized using FTP, a file transfer protocol that uses network transmission, corresponds to information input unit 101. The file input device 301 may be a computer system that uses an ftp program on a UNIX OS platform. The use of file transfer protocols other than FTP, such as SMTP, NNTP, and HTTP, is also acceptable, and there is also a computer system using the NCSA Mosaic program as the file input device 301 that uses HTTP. Mosaic not only allows file input, but also allows general digital information input.

The host number maintenance device 302, which maintains and manages the host number of the computer system connected by ftp, corresponds to information attribute input unit 103. The information that the host number maintenance device 302 handles is "the fact that information was input by a certain computer system", and the attribute is the host number. The host number is merely a finite number, therefore it can be maintained by the register or memory. Items other than the host number may also be used as the attribute. For example, the remote current directory can be obtained from the connected computer system through the PWD command in the FTP protocol, which can be used as the attribute. In general, the attribute to be maintained can be any information which can be obtained from the remote computer. In addition, the attribute can originate in a connection to a remote computer system. For example, it could be any parameter of the transport service quality as regulated in the JIS standard's X5108.

The host database 307, which outputs one or several host numbers when an organization name is input, corresponds to the attribute database 107. Database 307 has several lines of records, where several organization name fields and an organization name vs. host correspondence maintenance table, which has host fields including one or several host numbers, is maintained (see FIGS. 8, 9 and 10). Database 307 examines, line by line, whether the character or character string input matches the character string recorded in the organization field, and then outputs one or several host numbers whose organization names are contained in the line. An error is output if there are no matches.

Next, a detailed description of the registration and search in the second configuration will be given. In the second configuration, an (image) database 103 called image DB4 is configured with the following GSQL formula:

GSQL Formula 4-1:
CREATE SCEMA INTO '/test/db4';
GSQL Formula 4-2:
CREATE TABLE imageDB4 (
   HOSTNO INTEGER (12)
   IMAGE VARIABLE CHARACTER
);

GSQL formula 4-1 displays how to configure a database called db4 in a directory called /test. GSQL formula 4-2 describes the inner structure of database db4. Namely, it displays that a database called imageDB4 is being configured, where the attribute as a primary argument is the name HOSTNO, which can be extended up to 12 characters string and the secondary argument is image information data called IMAGE, where the character string has a variable length.

When the designated host number Y is designated as the ftp program's startup argument and is connected to a remote computer system with FTP protocol, the host number Y is output to the host number maintenance device and is maintained. Next, the user specifies the get command and file name to the ftp program and inputs the user's desired file. The file can be an image input, or could be anything else. According to the user's specification, the ftp program inputs the image file from the remote computer system, and send the output to registered command generation device 304. According to the image file input, host number maintenance device 302 sends the host number to the registered command generation device 304. The registered command generation device 304 receives the above file and host number, then the file is registered in the image information database 303 and the host number becomes the search key.

The commands generated by the registered command generation device 304 are the following:
GSQL Formula 4-3:
INSERT INTO imageDB4 VALUES (Y, 'Imagedata');

In GSQL formula 4-3, the primary argument is that the host number is Y, and it is data displaying the host number in integers, as output from the host number maintenance device. The secondary argument is a character string 'Imagedata', which is the image data input from the file input device 301, encoded into a text character string. Also, the formula displays the registered command that assigns the host number as the search key in Imagedata and registers it to the database imageDB4.

Encoding of image data can be done with the method described above, but registering without encoding can also be accomplished.

The information search will be explained next.

When an organization name, which owns a remote computer system with desired image information input, is input through keyboard device 306, the character string displaying the organization name is sent to the host database 307 and the host database 307 outputs one or several host numbers, which correspond to the organization name, to the search command generation device 308. In this configuration, one or several host numbers are assigned to an organization name.

Figure 8:
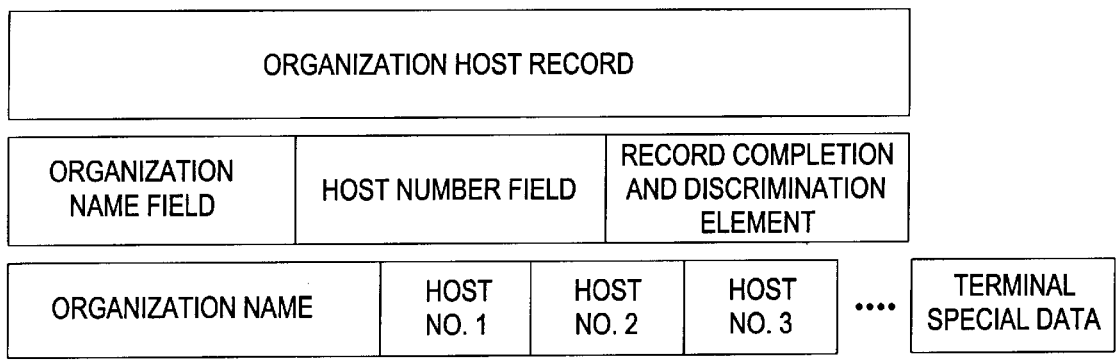
FIG. 8 is a geographic name coordinate record utilized in the configuration of FIG. 7.
Figure 9:
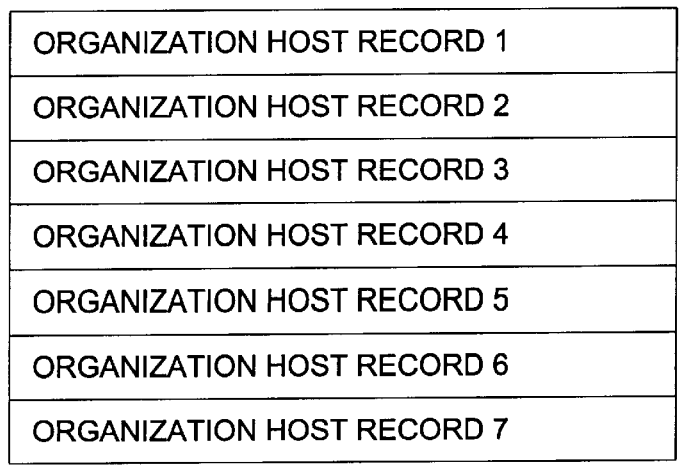
FIG. 9 is a host maintenance table utilized in the configuration of FIG. 7.

FIG. 8 shows the format of the geographic name coordinate record of the organization name and FIG. 9 is a host maintenance table. One record is formed of an organization name field that stores the organization name and the host field that stores 1 or several host numbers. Since the host field depends on the number of stored host numbers and has variable lengths, it is managed as the host number list and stores end symbols as special distinguishers at the end of the host number list. FIG. 10 displays a specific example of a organization name vs. host management table, which is structured by several records.

The operation of the host database 307 is explained along with the organization name vs. management table displayed in FIG. 10. First, when the organization name "Paersonnel" is input from the keyboard device 306, the character string is sent out to the host database as the search key. The host database 307 compares each record's organization name with "Personnel", and if there is a match, that record's host field is added to the output host list.

In FIG. 10 where a specific host vs. organization name management table is displayed, "Personnel" is included in record 3's organization name field, therefore causing the output host coordinate list to become {1, 2, 3}. This means that "Personnel" has computer systems with these three host numbers. The host database 307 sends out the above output host list to the search command generation device 308.

Further, in the host database 307, the use of hash tables is allowed for searching. Structuring a geographic name database using a relational database system is also possible.

The search command generation device 308 constructs a GSQL formula in order to search image information database 303 based on the several host numbers given from the host database 307. In this configuration, the following GSQL formulae are constructed.

GSQL Formula 4-4:
DECLARE LOCAL TEMPORARY TABLE temp4(
   HOSTNO INTEGER(12)
   IMAGE VARIABLE CHARACTER
   );
GSQL Formula 4-5:
INSERT INTO temp. temp4
   SELECT HOSTNO, IMAGE
   FROM imageDB4
   WHERE HOSTNO IN:searchPlaceString;
GSQL Formula 4-6:
COMMIT;
GSQL Formula 4-7:
SELECT DISTINCT IMAGE
   FROM temp. temp4;

The above GSQL formulae are sent to the image information database, and the corresponding image data is searched. If an image that meets the search condition is recorded, the host number and image data is expressed in one line and is output as the host image correspondence table. If no images match the search conditions, there is no output, but if there is one match, one line or several lines according to the amount of matches is output. In the host image correspondence table, one image data corresponds to a host number that represents the attribute value of the host number attribute, which is an attribute of the information "that image has been input from a certain remote computer system."

The liquid crystal display device 305 is the same as the one explained in the previous configuration.

In the second configuration, if the host number of the computer system of "Paersonnel" is in the record of Personnel's host image correspondence table, the host numbers, as mentioned previously, are 1, 2, or 3, so the image file input from the computer system of Personnel, as stated previously, will surely be in the host image correspondence table, which will be output from the GSQL search command.

As explained above, an image file input from the Personnel computer system can later be searched by the organization name "Personnel". Naturally, an image file input from a computer system of any organization can be searched.

In the second configuration, the search key has been the organization name, but it can be any one of the following: addresses, country names, prefecture names, city names, building names, facility names, departments, company names, corporation names, business office names, store names, sales store names, river names, mountain names, road names, route names, crossing names, (bus) stop names, station names, floor numbers, or postal codes.

In general, with a correspondence management table that maintains and manages the corresponding relation between every possible name used daily and its corresponding host number, constructed in advance, an information managing device, which searches images from any name registered in the correspondence managing table, can be provided. Mobile objects, especially, when inputting an image file from a remote computer, must connect to various network computers at their destinations. In this configuration, the host number was used as the attribute of the matter "input an image file from a certain computer system". Namely, a host number is automatically input according to the input image file, which is assigned as information for searches, and is recorded and managed in an information database. The user needs no knowledge of special keywords of search information when recording image information, and there is no need for the pre-processing of the recognition processing and statistical processing of the image. Therefore proper information can be searched with character strings as clues, which are fixed with the host number of the connected host computer upon input.

Further, when inputting from a mobile object, information registered in the database is not restricted to image information and can be characters, character strings, audio information, or video information. Audio and video information will be encoded into text data in the same manner as the above example embodiment, and then can be decoded and restored.

Also, information is searched using search information including the attribute value, which is first measured as the attribute value of an attribute that results when information is input and is then recorded with information, and is followed by the transformation of the search key into the attribute value. Thus, there is no trouble providing a search key which is currently present when inputting information, and there is also no need for pre-processing to generate a search key. In addition, search methods using information attributes, such as "Image file input from the computer system of Personnel", enables a search function much as a human being recollects his or her memory, thus providing an extremely flexible search method, and increases the adaptability of information management of network systems including mobil objects.

The following is an explanation of a third configuration of the first embodiment of the invention. The third configuration is a variation of the first configuration shown in FIG. 2, where the graphical user interface 406 replaces the keyboard device 206.

Figure 11:
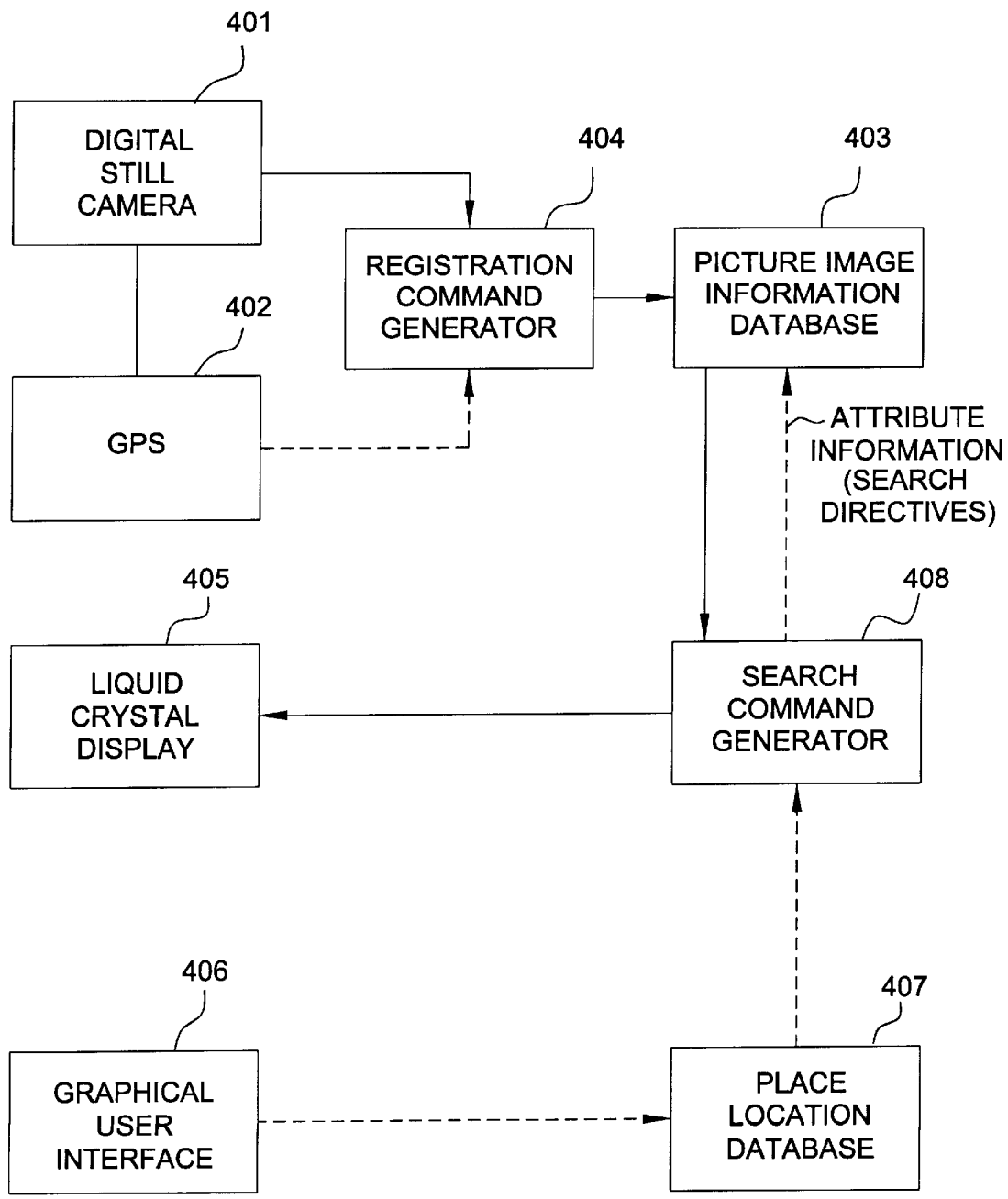
FIG. 11 is a block diagram of a third configuration of the embodiment of FIG. 1.

FIG. 11 is a block diagram of the third configuration, and parts and components that are the same as parts and components in FIG. 2 have corresponding reference numbers and a detailed explanation of the components and parts is omitted.

The graphical user interface device 406 in diagram 11 outputs region numbers into a geographic name database, where the region numbers correspond to regions specified by pointing devices such as a mouse on specified figures displayed in the graphical display. A digitizing tablet may be used, of course, where the specified region can be specified on the figure on the tablet, by a simulating digitizing pen. Also, it could be a structure where keyboard input specifies the region and the color of the designated region of the figure.

By classifying the regions which can be specified, it becomes possible to specify regions in smaller regional units, or in greater regional units. The use of various maps such as route maps is also possible. Also, the range of regional choice, such as the range from a specified position, can be changed by the user's specification.

The second embodiment of the invention will now be explained. The second embodiment omits the attribute database 108 of the first embodiment, conducts searches with the search key itself, and includes the search key generating unit 507, which transforms detected attribute values into search keys, and registers search keys along with the information.

Figure 12:
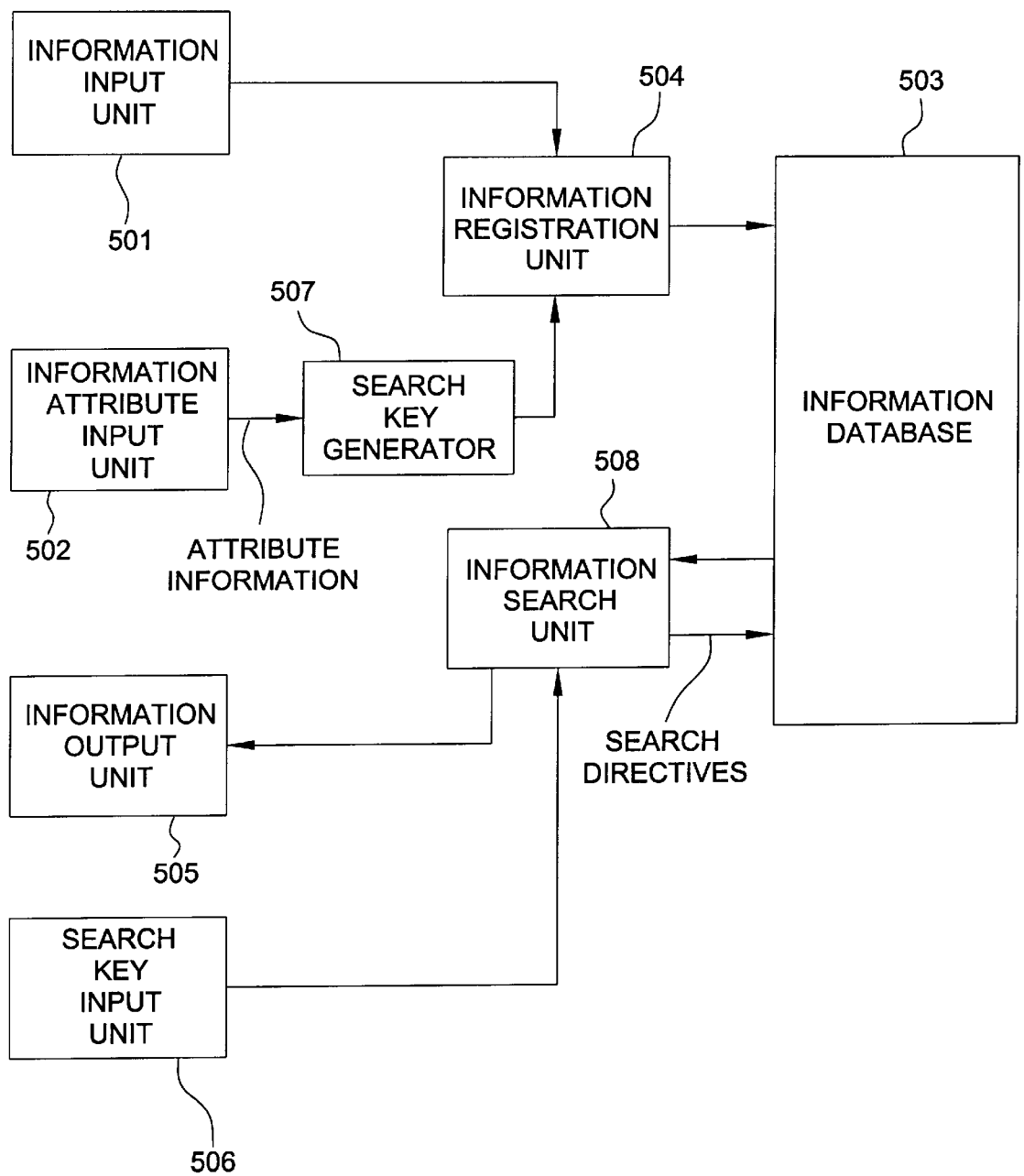
FIG. 12 is a block diagram of a second embodiment of the invention.

FIG. 12 is a block diagram of the second embodiment of the invention. The information managing device according to the second embodiment contains an information input unit 501, an information attribute input unit 502, an information database 503, an information registration unit 504, an information output unit 505, a search key input unit 506, a search key generation unit 507, and an information search unit 508. The information input unit 501 inputs information such as text and images. It could also be the input unit of a mobile information processing device (not shown in the diagram), or an input device connected to a mobile information processing device. Although the mobile information processing device is not shown, it is continuously or intermittently connected to a network system (a computer system where several computers are connected into a network). Information attribute input unit 502 detects the attributes of information occurring in a mobile information processing device (information input unit 501) and initiated by information input. Search key generation unit 507 transforms detected attribute values into search keys. Information registration unit 504 registers information and search keys to the information database 503.

Search key input unit 506 accepts search information from users, such as search keys, where the information search unit 508 sends search directives in the information database, which contains search keys, and then transfers the search results to an information output unit 505, where the search results are output.

Search key generation unit 507 is a geographic name database which contains, for example, a geographic name vs. coordinate correspondence table as used in the first embodiment of the invention. For example, using the geographic name database, there is an output at all times of geographic name fields, containing the region Z where coordinates (X, Y) are positioned, where coordinates (X, Y), representing the latitude and longitude pair output from the information attribute input unit 502, are formed with each line of the geographic name vs. coordinate correspondence managing table coordinate field coordinates.

Other aspects of the configuration are almost identical to the first embodiment, therefore corresponding reference numbers are provided, but detailed explanations are omitted.

The following is a detailed explanation of the registration of the second embodiment, and information searches. Further, position information will be used for the attribute, geographic names will be used for the search keys, and managing image information will be assumed.

First, information registration will be explained. A database (search key generation unit 507) called areaDB is created with the following GSQL formula 2-2 and an (image) information database 503 called imageDB2 is created with the following GSQL formula 2-3.

GSQL Formula 2-1:
CREATE SCEMA INTO '/test/db2';
GSQL Formula 2-2 (geographic name vs. coordinate correspondence managing table):
CREATE TABLE areaDB(
   LLlongitudeflag CHARACTER (1)
   LLONGITUDE INTEGER (8)
   LLlatitudeflag CHARACTER (1)
   LLLATITUDE INTEGER (9)
   RUlongitudeflag CHARACTER (1)
   RULONGITUDE INTEGER (8)
   Rulatitudeflag CHARACTER (1)
   RULATITUDE INTEGER (9)
   areaNAME VARIABLE CHARACTER
);
GSQL Formula 2-3 (table of registration results)
CREATE TABLE imageDB2(
   longitudeflag CHARACTER (1)
   LONGITUDE INTEGER (8)
   latitudeflag CHARACTER (1)
   LATITUDE INTEGER (9)
   areaNAMES VARYINGVARIABLE CHARACTER
   IMAGE VARIABLE CHARACTER
);

The GSQL formula 2-1 shows the creation of the database of the name db2 in the directory known as /test. The GSQL formula 2-2 records the internal construction of db2. In other words, the attribute, which serves as the first argument with the name LLlongitudeflag, is a character having a length 1; the attribute, which serves as the second argument with the name of LLLONGITUDE, is an integer having a length of 8; the attribute, which serves as the third argument with the name of LLlatitudeflag, is a character having a length of 1; the attribute, which serves as the fourth argument with the name of LLLATITUDE, is an integer having a length of 9; the attribute, which serves as the fifth argument with the name of RUlongitudeflag, is a character having a length of 1; the attribute, which serves as the sixth argument with the name of RULONGITUDE, is an integer having a length of 8; the attribute, which serves as the seventh argument with the name of RUlatitudeflag, is a character having a length of 1; the attribute, which serves as the eighth argument with the name of RULATITUDE, is an integer having a length of 9; and the attribute, which serves as the ninth argument with the name of area NAME, is a character having a variable length, thereby manifesting the creation of the database known as areaDB.

The GSQL formulas 2-3 also records the internal construction of db2. In other words, the attribute of the first function with the name of longitudeflag has a character shape with the length of 1; the attribute of the second argument with the name of LONGITUDE has the character shape of an integer with a length of 8; the attribute of the third argument with the name of latitude flag has a shape of a character with a length of 1; the attribute of the fourth argument with the name of LATITUDE has the shape of an integer with a length of 9; and, when the fifth argument has an array of the name of the area NAMES with the data of location names, then the shape of the character of variable length is held as an element, and the number of the sixth region has the shape of a character of variable length with the name of IMAGE with the data of the screen information, and a database is created with the name of imageDB2.

Also in the second embodiment, as in the case of the first embodiment, the picture image information is input by means of an digital still camera, creating the coordinate data with GPS. However, in the second embodiment, the coordinate data from the GPS is sent to the place name database (search key creation unit 507).

The place location database (search key creation unit 507) has a place location corresponding coordinate corresponding management table shown in FIGS. 9–11. The respective coordinate field values {(X11, Y11), (X12, Y12)}, {(X31, Y31), and (X32, Y32)} of the third record and the first record of the place location corresponding coordinate management table is configured so that X11≦X1<X12, Y11≦Y1<Y12, X31≦X1<X32 and Y31≦Y1<Y32.

If the coordinates (X, Y) from the GPS are input, the region {(Xn, Yn), (Xm, Ym)} of the coordinate field of all of the lines of the place location correspondence coordinate correspondence management table, are input into the place location list that outputs the place location of all of the place location fields of the record that satisfies Xn≦X<Xm and Yn≦Y<Ym.

If all of the lines of the place location correspondence coordinates correspondent management table are searched, then the place location list which is maintained in the output place location list maintenance apparatus (not shown in the drawing) is output to the information registration unit 504 (the registration command generating apparatus).

The information registration unit 504 (registration command generating apparatus) creates the following GSQL formula:
GSQL Formulas 2-4:
DECLARE LOCAL TEMPORARY TABLE temp 2 (
    LLlongitude flag CHARACTER (1),
    LLLONGITUDE INTEGER (8),
    LLlatitude flag CHARACTER (1),
    LLATITUDE INTEGER (9),
    RUlongitudeflag CHARACTER (1),
    RULONGITUDE INTEGER (8),
    RUlatitudeflag CHARACTER (1),
    RULATITUDE INTEGER (9),
    areaNAME VARIABLE CHARACTER );
GSQL Formulas 2-5:
INSERT INTO temp. temp 2
    SELECT LLlongitudeflag, LLLONGITUDE, LLlatitudeflag,
    LLLATITUDE, RUlongitudeflag, RULONGITUDE, RUlatitudeflag,
    RULATITUDE, areaNAME
    FROM areaDB
    WHERE longitudeflag='E'
    AND LLLONGITUDE≦X
    AND RULONGITUDE>X
    AND latitudeflag='N'
    AND LLLATITUDE≦Y
    AND RULATITUDE>Y;
GSQL Formulas 2-6:
SELECT DISTINCT areaNAME
FROM temp. temp 2
INTO places Array [];
GSQL Formulas 2-7:
INSERT INTO imageDB2 (
longitudeflag, KEIDO,
longitudeflag, IDO,
areaNAMES, IMAGE)
VALUES ('E', X, 'N', Y,: placesArray [], 'IMAGE DATA';
GSQL Formulas 2-8:
COMMIT;

The place Arrays within with GSQL Formulas 2-2 through 2-6 and the GSQL Formulas 2-2 through 2-7 are defined as array variables, and comprise the external variables of the entered SQL characters. The picture image data, as explained in the first embodiment, may be encoded, or not encoded, and registered in its existent state.

Next, a detailed explanation is provided with respect to the search of the information. The registered locations for the picture image information for which a search is desired and the names of the regions including the locations are input from the search key input unit 506, and the string which manifest the input place names are sent to the information search unit 508, where the information search units 508 creates a GSQL formula for searching for the picture image information from the string.
GSQL Formulas 2-9:
SELECT IMAGE
    FROM imageDB2
    WHERE areaNAMES=: searchString;
In this instance, the :search String was input, and the string that represents the place location is stored, and comprises an external variable of the entered SQL character.

Since the following operation is substantially the same as that of the first embodiment, the explanation will not be repeated.

The second embodiment is added to the results of the first embodiment, and since the construction is the same as the previous construction of the information data base comprising "applying the key word, and registering the information method", the effect is that the previous information data base can be utilized in its existent state. In addition, information which has been registered in the present embodiment utilizes the type of application in which searching is accomplished of information using the indication of the previous key word, with the merit of search capability.

An explanation of the third embodiment of the invention is provided next. In the third embodiment, a user who utilizes a mobile information processor records the picture image information and preserves it in the database of a remote information processing apparatus, following which the mobile information processor or other information processor is utilized so that the preserved information can be searched.

Figure 13:
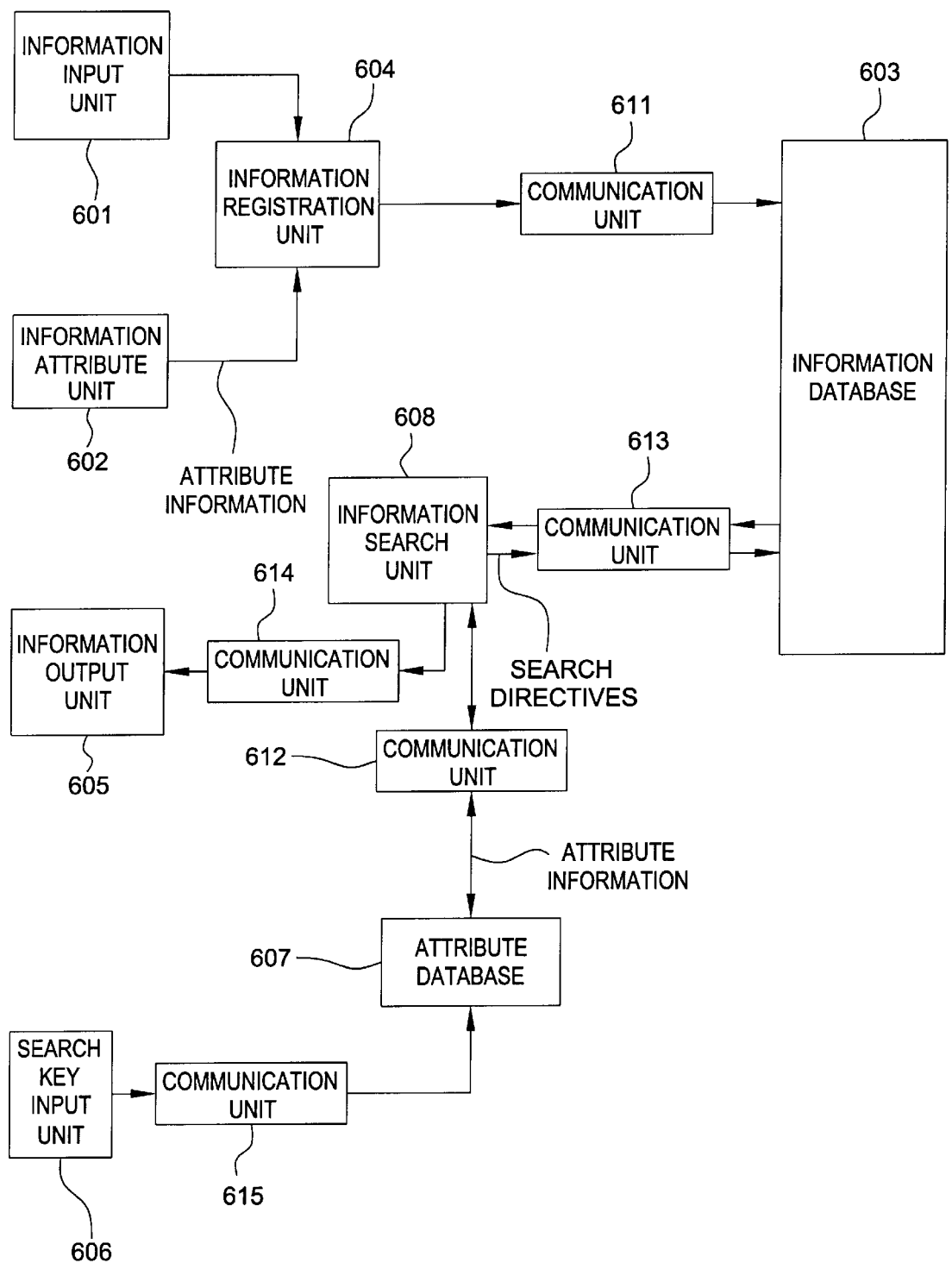
FIG. 13 is a block diagram of a third embodiment of the invention.

FIG. 13 is a block diagram of the third embodiment of the invention in which the information processor is provided with an information input unit 601, an information attribute unit 602, an information database 603, an information registration unit 604, an information output unit 605, a search key input unit 606, an attribute database 607, an information search unit 608, and communication units 611–615. In the third embodiment, the information registration process is accomplished by the (mobile information processor) while the preservation of the information, the information search directive, the creation of the search key (attribute data base) and the output of the search results are performed by a separate information processor. The handling of the signal between the separate information processors is realized as shown by the communication units 611–615. Naturally, various changes may be made with respect to the configuration of the information processor in a network.

The information input unit 601 inputs the various information relating to the text and images and the like, and may be formed of an input unit of a mobile information processor (not shown in the diagram), or may be formed of an input apparatus which is directly connected to the mobile information processor. The mobile information processor, although not shown, is continuously, or intermittently connected to a network system (a computer system in which multiple computers are connected in a network). The information attribute input unit 602 detects the attributes of the created information originating in the attributes of the information created in the mobile information processor (information input unit 601) and the input information. The information registration unit 604 registers the information and the detected attribute values through the communication unit 611 and sends it to the information database 603. The search key input unit 606 receives the search key and the like search information from the user, and transmits it to the attribute database 607 through the communication unit 615, and the attribute database 607 outputs corresponding attribute values on the basis of the search information. The information search unit 608 sends out the search directive that includes the attribute values through the communication unit 613, relative to the information database 603, and transmits the search results to the information output unit 605 through the communication unit 614, outputting the search results.

If the communication unit 611–615 are eliminated, then the third embodiment of the invention becomes the same as the first embodiment. Hereafter an explanation is provided only with respect to the communication unit 611–615. As concerns other structure, the explanation is omitted for labels having corresponding locations.

The communication units 611–615 are each a network communication apparatus of a local area network system in which utilization is made of a TCP/IP protocol. The network communication, for example, makes use of a Unix OS "Socket library". With this embodiment, the network communication apparatus has a connection achieved prior to the operation of the registration of the information and the search. The network communication apparatus realizes the connection at the time of communication, and communication may be accomplished also without the establishment of a connection. In addition, in place of the communication by means of a Socket library, communication may be accomplished by the calling of remote procedures.

If each of the compositional elements of the invention eliminate the points having the function of obtaining data through the utilization of the communication units 611–615, then the structure of the third embodiment is the same as that of the first embodiment.

In accomplishing the registration of the data by means of the third embodiment, the information registration unit 604 receives and takes the data and attribute values, and creates GSQL Formulas 1-3 according to the first embodiment, and transmits them to the information database 603. The information database 603 receives them and accomplishes the registration of the information. In addition, in performing the search of the information, the string of the search information input from the search key input unit 606 is sent to the attribute database 607 through the communication unit 615, and the attribute database 607 converts the search key into attribute values. In other words, it converts them into multiple coordinate pairs, which are then sent to the information search unit 606 through the communication unit 612. The information search unit 608 produces the GSQL Formulas 1 through 4 and 1 through 8 according to the first embodiment on the basis of these, and transmits them to the information data base 603 through the communication means 613. In the information data base 603, searching is accomplished on the basis of the GSQL Formulas 1-4 through 1-8, and if the picture image information corresponds with the search conditions, then the coordinate picture image correspondence table is sent to the information output unit 605 through the communication unit 614.

As explained above, the third embodiment is characterized by the fact that it provides a configuration without the inclusion of a mobile information processing apparatus in the information database, adding to the results of the first embodiment. The information database, is attached, for example, to the home position computer, and is capable of selectively using the database of the information processor within the network.

Next, the fourth embodiment of the invention is described. The fourth embodiment realizes the second embodiment in the network system. A user who utilizes the mobile information processor records the picture image information and preserves it in the database of the remote information processor, subsequently by utilizing the mobile information processor or another information processor the preserved information can be searched. The method which is realized in the network is the same as that of the third embodiment.

Figure 14:
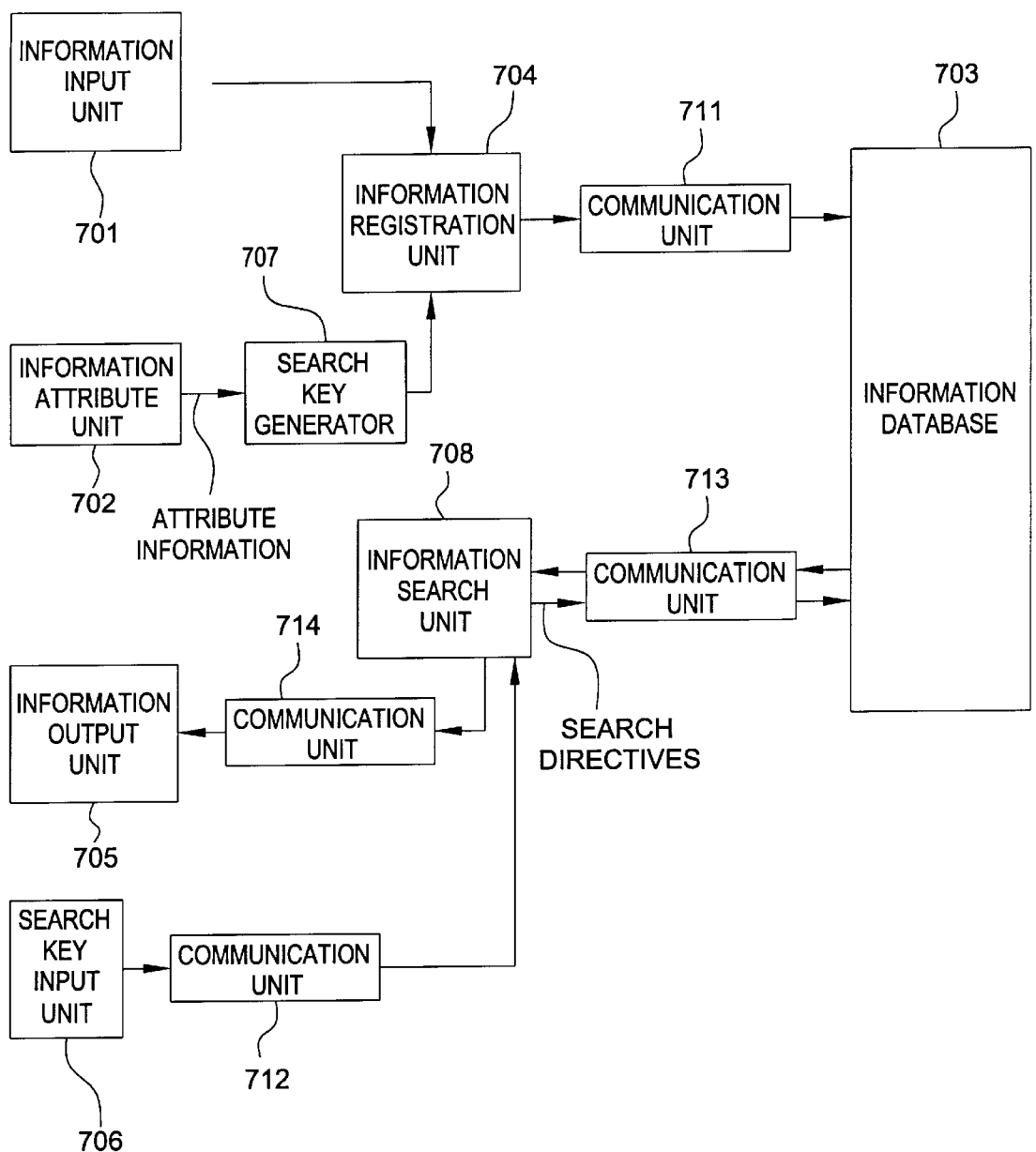
FIG. 14 is a block diagram of a fourth embodiment of the invention.

FIG. 14 is a block diagram of the fourth embodiment of the invention in which the information processing apparatus is equipped with an information input unit 701, an information attribute input unit 702, an information database 703, an information registration unit 704, an information output unit 705 (SIC), a search key input unit 706, a search key creation unit 707, an information search unit 708, and communication units 711–714. The data input unit 701 inputs the various information of the text image and the like. It may also include the input unit of the mobile information processing apparatus (not shown in the drawing), and may also include an input apparatus which is connected to the mobile body data processing device. The mobile information processor, although not clearly disclosed, may be continuously or intermittently connected to the network system (a computer system in which multiple computers are connected in a network). The information attribute input unit 702 detects the attributes of the input information, originating with the information attributes and the data input occurring in the mobile information processor (information input unit 701). The search key creation unit 707 converts the detected attribute values into a detection key. The information registration unit 704 registers the information and the search key in the information database 703 through the communication unit 711. The search key input unit 706 receives the search key and search information from the user, and the information search apparatus 708 transmits the search directive that includes the search key to the information database 703 through the communication unit 713 and transmits the search results to the information output unit 705, outputting the search results.

As explained above, according to the invention, the information attributes at the time of inputting the information are recorded along with the information, and subsequently, the input search key which has been input for the purpose of searching is converted into the attribute characteristics and, since information is searched by the attribute characteristics obtained as a result of the same, there is no need to consider the search key at the time of information registration and it is also not necessary to do an analysis of recognition processing and the like for the information, or for the creation of a search key.

Also, information attributes comprise information which easily becomes familiar to humans, making flexible, effective searching possible. In addition, according to the invention, the material attributes at the time of inputting the information are automatically converted into search keys in accordance with the characteristics of the attributes, and the search keys are added to the information and recorded. Also, when performing subsequent searches, searching is accomplished utilizing the search keys. Thus, there is no need to consider the search keys at the time of information registration and it is not necessary to create a search key through an analysis of the cognitive processing of the information. Also, since with searching, the information attributes comprise information which becomes easily familiar to individuals, searching can be flexibly and effectively performed.

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

What is claimed is:

1. An information management device, which is used in a network of multiple information processing devices, at least one of which is a mobile information processing device, and that manages information input from the at least one mobile information processing device, the information management device comprising:

an information input unit that inputs information via the mobile information processing device;

an attribute value input unit that measures and inputs registration attribute information that includes at least one of attribute values that arise from the mobile information processing device and attribute values resulting from the input of the information;

an information database that stores the input information along with the corresponding registration attribute information;

an information registration unit that registers the input information and the corresponding registration attribute information in the information database;

a search key input unit that inputs at least one search key;

an attribute database unit that outputs at least one searching attribute information in response to the input of the at least one search key;

an information search unit that outputs to the information database search instructions that include at least one searching attribute information output from the attribute database; and an information output unit that outputs information from the information database in response to the search instructions.

2. An information management device, which is used in a network of multiple information processing devices, at least one of which is a mobile information processing device, and that manages information input from the mobile information processing device, the information management device comprising:

an information input unit that inputs information via the mobile information processing device;

an attribute value input unit that measures and inputs attribute information that includes at least one of attribute values that arise from the mobile information processing device and attribute values resulting from input of the information;

a search key generation unit that generates at least one search key in response to the input attribute information;

an information database that stores the input information along with the corresponding search keys;

an information registration unit that registers the input information and the at least one search key in the information database;

a search key input unit that inputs the at least one search key;

an information search unit that outputs to the information database search instructions that include the at least one search key; and an information output unit that outputs information from the information database in response to the search instructions.

3. The device according to claim 1, further comprising:

a first communication unit that transmits information and registration attribute information to the information database from the information registration unit; and a second communication unit that transmits search keys to the attribute database from the search key input unit;

a third communication unit that transmits searching attribute information to the information search unit from the attribute database;

a fourth communication unit that transmits information to the information search unit from the information database and that transmits the search information to the information database from the information search unit; and a fifth communication unit that transmits information to the information output unit from the information search unit.

4. The device according to claim 2, further comprising:

a first communication unit that transmits information and search keys to the information database from the information registration unit;

a second communication unit that transmits search keys to the information search unit from the search key input unit;

a third communication unit that transmits information to the information search unit from the information database and transmits the search information to the information database from the information search unit; and a fourth communication unit that transmits information to the information output unit from the information search unit.

5. An information management device, comprising:

an information input unit that inputs information;

an attribute value input unit that measures and inputs attribute information that includes at least one of information registration attribute values from the information input unit and the information attribute values resulting from the input of the information;

an information database that stores the information along with the corresponding registration attribute information;

an information registration unit that registers the information and the registration attribute information in the information database;

a search key input unit that inputs search keys;

an attribute database unit that outputs at least one of a searching attribute information in response to the search keys;

an information search unit that outputs to the information database search information that includes at least one searching attribute information output from the attribute database; and an information output unit that outputs information from the information database in response to the search information.

6. An information management device, comprising:

an information input unit that inputs information;

an attribute value input unit that measures and inputs attribute information that includes at least one of information attribute values from the information input unit and information attribute values resulting from the input of the information;

a search key generation unit that generates at least one search key in response to the input attribute information;

an information database that stores the information along with the corresponding at least one search key;

an information registration unit that registers the information and the at least one search key in the information database;

a search key input unit that inputs the at least one search key;

an information search unit that outputs to the information database search information that includes the input at least one search key; and an information output unit that outputs information from the information database in response to the search information.

7. The device according to claim 1, wherein the information input unit is used in one of an information input unit of the at least one mobile information processing device and an information input device connected to the at least one mobile information processing device.

8. The device according to claim 2, wherein the information input unit is used in one of an information input unit of the at least one mobile information processing device and an information input device connected to the at least one mobile information processing device.

9. The device according to claim 1, wherein the attribute value input unit inputs a longitude and a latitude residing in the mobile information processing device prior to inputting the registration attribute information and includes input search keys and place locations from the search key input unit, the attribute database unit including a place location database, wherein if a search key is input into the attribute database unit, then it outputs at least one of coordinates which manifest longitude and latitude as a pair.

10. An information management method, wherein multiple information processors are connected and utilized in a network that includes at least one mobile information processor from among a plurality of information processors, and wherein the information which is a plurality of input from the mobile information processor is stored in a database, the method comprising:

inputting information through the mobile information processor;

measuring and inputting registration attribute information that includes at least one of information attribute values originating in the inputting of the information attribute values and information originating in the mobile information processor;

registering the information and registration attribute information in a database;

inputting search keys;

outputting at least one of a searching attribute information in accordance with the input search key;

outputting search information that includes at least one of the output searching attribute information;

searching the information from the database on the basis of the output search information; and outputting the information which has been searched.

11. An information management method, wherein multiple information processors are connected and utilized in a network that includes at least one mobile information processor from among a plurality of information processors and wherein input information from the mobile information processor is stored, the method comprising:

inputting information through the mobile information processor;

measuring and inputting attribute information that include at least one of information attribute values originating in the inputting of the information attribute values and information originating in the mobile information processor;

outputting specified search keys on the basis of the attribute information;

registering the information and search keys into a corresponding database;

outputting the search keys and search information that includes at least one of the input search keys;

searching the information from the database on the basis of the output search information; and outputting the information, which has been searched.

* * * * *